United States Patent
Peyla et al.

(10) Patent No.: US 12,355,567 B2
(45) Date of Patent: Jul. 8, 2025

(54) EFFICIENT LARGE OBJECT TRANSPORT

(71) Applicant: iBiquity Digital Corporation, Columbia, MD (US)

(72) Inventors: Paul Peyla, Elkridge, MD (US); Brian W. Kroeger, Sykesville, MD (US); Gadiel Seroussi, Cupertino, CA (US)

(73) Assignee: iBiquity Digital Corporation, Columbia, MD (US)

( * ) Notice: Subject to any disclaimer, the term of this patent is extended or adjusted under 35 U.S.C. 154(b) by 0 days.

(21) Appl. No.: 18/223,802

(22) Filed: Jul. 19, 2023

(65) Prior Publication Data

US 2023/0361915 A1 Nov. 9, 2023

Related U.S. Application Data

(63) Continuation of application No. PCT/US2021/014620, filed on Jan. 22, 2021.

(51) Int. Cl.
*H04L 1/00* (2006.01)

(52) U.S. Cl.
CPC .......... *H04L 1/0071* (2013.01); *H04L 1/0057* (2013.01)

(58) Field of Classification Search
CPC .............................. H04L 1/0071; H04L 1/0057
See application file for complete search history.

(56) References Cited

U.S. PATENT DOCUMENTS

| | | | |
|---|---|---|---|
| 2004/0243913 A1* | 12/2004 | Budge ................. | A61B 6/5282 714/776 |
| 2014/0270006 A1* | 9/2014 | Bi ........................ | H04H 20/426 375/340 |
| 2019/0386776 A1* | 12/2019 | Lefevre ................ | H04L 1/0042 |
| 2020/0310686 A1* | 10/2020 | Truong ................. | G06F 3/061 |
| 2023/0359755 A1* | 11/2023 | Algie .................... | G06F 3/0604 |

FOREIGN PATENT DOCUMENTS

EP 3582418 A1 12/2019

OTHER PUBLICATIONS

International Search Report for PCT/US2021/014620 mailed Sep. 29, 2021. 3 pgs.

* cited by examiner

*Primary Examiner* — Thien Nguyen
(74) *Attorney, Agent, or Firm* — Lerner David LLP

(57) ABSTRACT

A method comprises partitioning a data object into a sequence of nested data objects each including fragments having K symbols per fragment. The method further comprises processing the nested data objects to produce sequences of coded payloads corresponding to the nested data objects. The processing includes, for each nested data object: using (n, K) coding for which n>K, individually coding the fragments of the nested data object into codewords with n codeword symbols per codeword; and generating, from the codewords, a sequence of coded payloads that are unique for the nested data object. The method further comprises transmitting coded payloads of the sequences of coded payloads.

30 Claims, 10 Drawing Sheets

EFFICIENT LARGE OBJECT TRANSPORT

CROSS REFERENCE TO RELATED APPLICATIONS

This application is a continuation of International Application No. PCT/US2021/014620, filed on Jan. 22, 2021, the disclosure of which is incorporated herein by reference.

TECHNICAL FIELD

The present disclosure relates to transporting large Objects using efficient coding techniques.

BACKGROUND

A conventional Large Object Transport (LOT) technique partitions a large Object into many Fragments at a transmitter, and then transmits the Fragments to a receiver in sequence as the Object is continually repeated until the Object expires. This allows the receiver to collect the Fragments over multiple sessions where some Fragments may be corrupted. The large Object transmission can continue for long periods of time with intermittent reception conditions over multiple receive sessions. This repetition technique disadvantageously suffers from extreme inefficiency due to reception of duplicate Fragments, where every Fragment of the original Object must be successfully received.

DESCRIPTION OF EXAMPLE EMBODIMENTS

Example Embodiments

ELOT Definition

Figure 1:
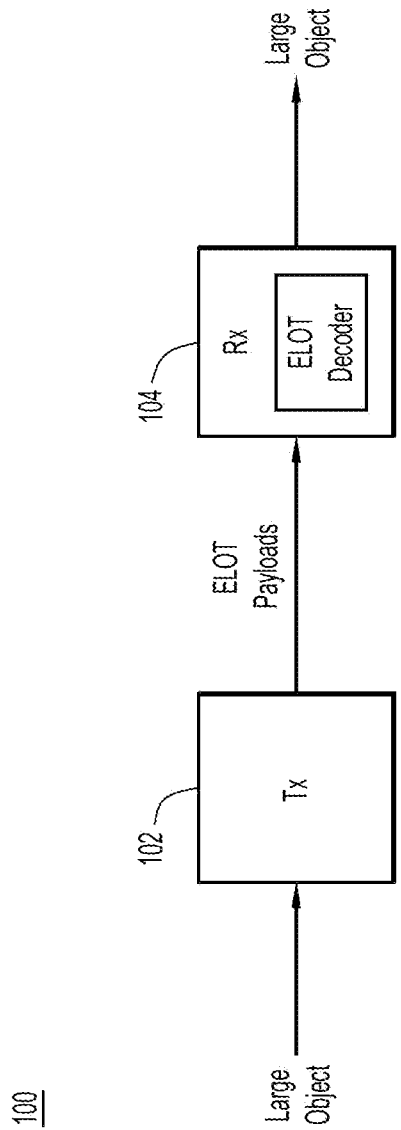
FIG. 1 is a block diagram of an example communication system in which Efficient Large Object Transport (ELOT) may be implemented.

FIG. 1 is a block diagram of an example communication system 100 in which embodiments directed to Efficient Large Object Transport (ELOT) may be employed. System 100 includes a transmitter (Tx) 102 and a receiver (Rx) 104, which may be an HD radio transmitter and an HD radio receiver, for example. ELOT efficiently communicates large Objects (e.g., content in data files) (also referred to simply as "Objects") from transmitter 102 to receiver 104, and provides improvements over an existing LOT protocol. The existing LOT technique partitions a large Object into many Fragments at the transmitter, which are then transmitted to the receiver in sequence as the Object is continually repeated until the Object expires. This allows the receiver to collect the Fragments over multiple sessions where some Fragments may be corrupted. Since the large Object transmission can continue for long periods of time with intermittent reception conditions over multiple receive sessions, a goal is to minimize the total (aggregated) required receive time. Most straightforward repetition techniques of this type (such as the existing LOT) can suffer from extreme inefficiency due to reception of duplicate Fragments, where every Fragment of the original Object must be successfully received. In contrast, the ELOT technique presented herein avoids the duplicate Fragment inefficiency by coding each new transmitted Packet with useful information needed to reconstruct the original large Object. Then the Object can be reconstructed with minimal coding or Fragment duplication overhead.

ELOT accommodates an efficient, scalable, nested coding approach for large Object expansion using Nested Objects. An example method to achieve the goal of ELOT efficiency is to employ an extremely low rate, but large, Reed-Solomon (RS) block code. At transmitter 102, the ELOT transmit process receives or retrieves a large Object and encodes it into a sequence of Payloads transmitted to receiver 104 in message packets, in the ELOT message format. A $RS(2^{16}, K)$ block code is used, having 16-bit symbols at code rate $R=1/256$ or less. Each 256-byte Payload contains one RS symbol from each of 128 parallel RS codewords. Receiver 104 includes an ELOT decoder to decode the Payloads, and recover the large Object. The decoding of such large Objects using an extremely low rate, but large, RS code would normally be considered impractical with conventional RS decoding algorithms. However, alternate efficient algorithms (implemented in the ELOT decoder) were developed for practical RS encoding and decoding, enabling this ELOT application.

The new ELOT message format may be similar to the existing LOT format. A main difference is that the 256-byte LOT Fragments are replaced with RS-encoded Payloads, which are optionally interleaved. The total number of bytes in the Object is defined as Nobj. Objects having no more than 65536 bytes, for example, include a single Nested Object. Objects larger than 65536 bytes, for example, are partitioned into multiple Nested Objects. The number (NO) of Nested Objects within an Object is determined by dividing the number of Object bytes by 65536, for example, then rounding up. The Nested Objects are identified by NestID (0 . . . NO−1).

$$NO = \text{ceil}\left[\frac{Nobj}{65536}\right]$$

The number of bytes Nnest in every Nested Object is determined by dividing the number of Object bytes by, for example, 256 times the number of Nested Objects, then rounding up, and multiplying by 256, for example. The following expression ensures that Nnest is a multiple of 256 bytes:

$$Nnest = 256 \cdot \text{ceil}\left\lceil \frac{Nobj}{256 \cdot NO} \right\rceil$$

The Object bytes are sequentially placed into the Nested Objects, Nnest at a time. The last Nested Object is zero-padded, if necessary, so it also contains Nnest bytes.

Operations and data structures used to produce a sequence of Payloads from an Object are described in further detail below in connection with FIGS. 2-7.

In the ensuing description and associated figures, an Object and a Nested Object may also be referred to as a "data Object" and a "Nested Data Object," respectively, because the Object and the Nested Object each contain information/data to be transported. Accordingly, the terms "Object" and "Nested Object" are synonymous with, and may be used interchangeable with, the terms "data Object" and "Nested Data Object," respectively. Additionally, because a "Payload" carries codeword symbols of codewords, the "Payload" may be referred to as a "coded Payload." Thus, the terms "Payload" and "coded Payload" are synonymous and may be used interchangeably. Also, the labels "k" and "K" are interchangeable.

Nested Objects

Figure 2:
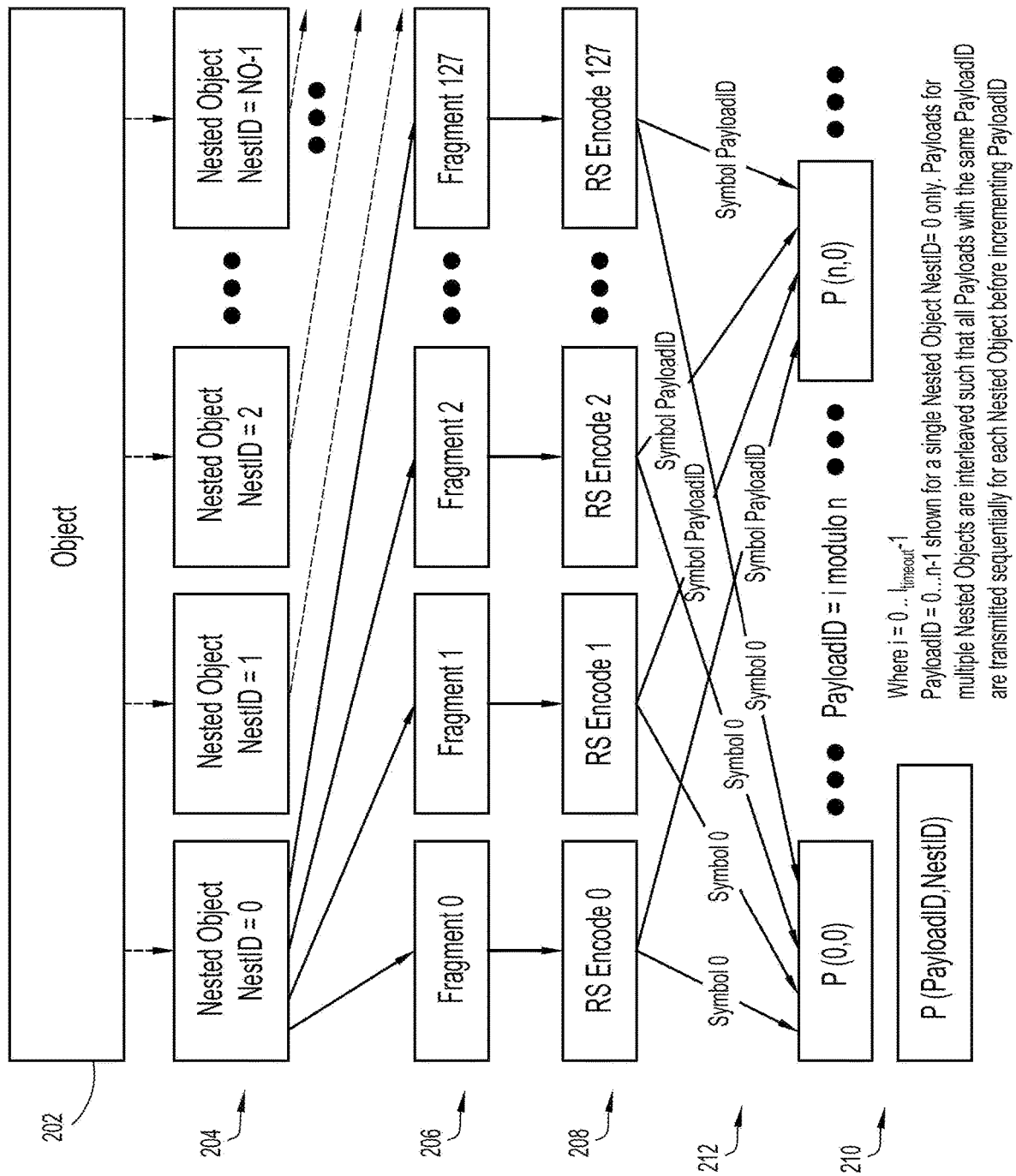
FIG. 2 shows example operations and hierarchical data structures used by a transmitter of the communication system to produce a sequence of Payloads from an Object according to ELOT.

FIG. 2 shows example operations and hierarchical data structures used by transmitter 102 to produce a sequence of Payloads from an Object according to ELOT. As shown in FIG. 2, an Object 202 is partitioned into Nested Objects 204 with Nested Object identifiers NestID=0 to NO−1. In an example, Nested Objects 204 each contain Nnest<=65536 bytes, where Nnest is a multiple of 256 bytes. The Nnest bytes of each Nested Object are partitioned into 128 equal-size data or information Fragments 206 (0, 1, 2, 3 . . . 127) of 2·K bytes each. Each Fragment contains K symbols of information, where K<=256 is the number of 2-byte symbols comprising each Fragment of a Nested Object. The integer value of K is determined as a function of Nnest.

$$K = \frac{Nnest}{256}$$

Each of the 128 Fragments (information input) is separately Reed-Solomon (RS) encoded, forming 128 parallel RS codewords (RS Encode) 208 (0, 1, 2, 3 . . . 127). Each of the 128 RS encoders uses all K symbols from its corresponding Fragment to produce one encoded 2-byte symbol per Payload among Payloads 210 generated from Fragments 206. These 128 RS-encoded symbols (indicated generally at 212) are concatenated (0, 1, 2, . . . 127) to form the 256-byte Payload.

The encoding starts for this Nested Object at symbol index zero, indicated as the zeroth PayloadID. Subsequent Payloads are generated in the same manner, except the RS symbol index (same as PayloadID) continues sequentially as 0, 1, 2, 3 . . . , modulo 65636, until the transmission is terminated. This encoded ELOT Payload replaces the original 256-byte Fragment payload used in the original LOT message format.

Prior to transmission, Headers are prepended, for example, to each Payload to form an ELOT Message or packet. The Header contains (among other fields) a Position field (comprised of K, NestID, and PayloadID) and a unique identifier for each transmitted Object, the LotID. In the example of FIG. 2, PayloadID acquires values i modulo n, where i=0 . . . $I_{timeout}$−1 and n is the number of symbols in the RS codeword ($2^{16}$ in this example). The PayloadID $I_{timeout}$−1 is acquired when the "timeout" has expired and transmission ceases. A detailed description of the ELOT Header and message structure is provided below in connection with FIGS. 5 and 6. Also, details of the RS code are presented below under the Section heading "Reed Solomon Code."

Figure 3:
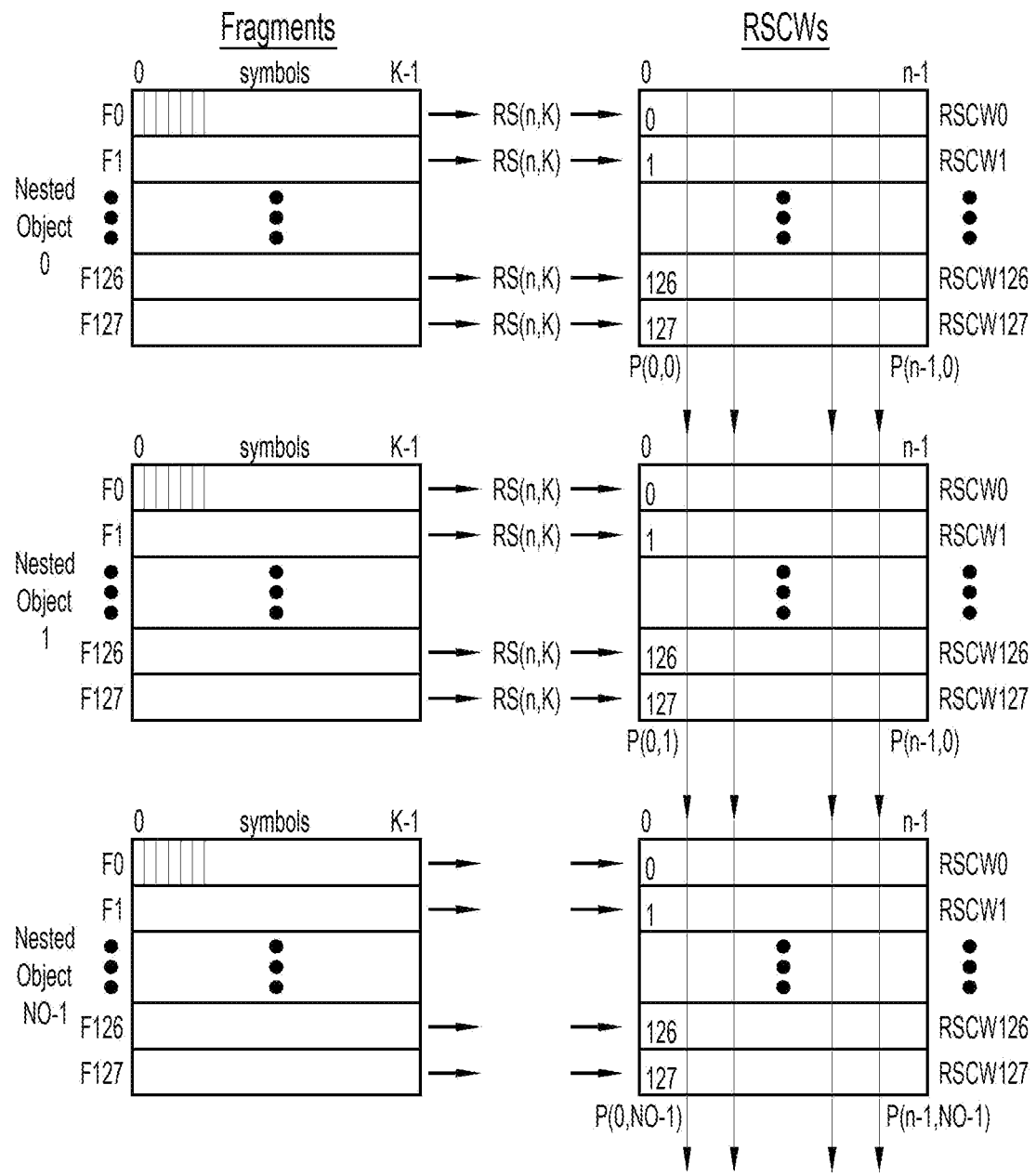
FIG. 3 shows example operations expanding on the operations of FIG. 2.

FIG. 3 shows example operations expanding on those described above in connection with FIG. 2, to generate/construct Payloads 210 from Nested Objects 204 (Nested Objects 0 to NO−1), and the various data structures that result from the operations. In FIG. 3, Nested Objects 0 to NO−1 are shown arranged in a column of the left-hand side of the figure. The Nested Objects each includes respective Fragments F0-F127 arranged in rows. Each Fragment includes K symbols.

Initially, Nested Object 0 is processed to generate a sequence of Payloads for that Nested Object, as follows. Fragments F0-F127 of the Nested Object are separately or individually coded into corresponding ones of codewords RSCW0-RSCW127, also arranged in rows. A respective block of codewords RSCW0-RSCW127 corresponding to each Nested Object is shown on the right-hand side of FIG. 3. Each codeword (e.g., RSCWi) includes a sequence of 0 to n−1 (e.g., 0-65535) codeword symbols. A sequence of Payloads P(0,0)-P(n−1,0) corresponding to Nested Object 0 is generated from the codewords RSCW0-RSCW127 corresponding to the Nested Object, one codeword symbol at a time, as follows. Starting with codeword symbol 0, all of the codeword symbols (moving down the first column of codewords RSCW0-RSCW127 for Nested Object 0) are concatenated into Payload P(0,0). Shifting-right to next codeword symbol 1, all of the codeword symbols (moving down the second column of codewords RSCW0-RSCW127 for Nested Object 0) are concatenated into Payload P(1,0). The shifting and concatenating process repeats across all of the symbol positions until the sequence of Payloads P(0,0)-P(n−1,0) are generated for Nested Object 0. This process interleaves codewords RSCW0-RSCW127 across the sequence of Payloads P(0,0)-P(n−1,0). More specifically, the process interleaves the n codeword symbols per codeword across the sequence of Payloads, such that the Payloads of the sequence of n Payloads each includes one codeword symbol from all of the codewords. Such interleaving of codewords advantageously combats loss of transmitted signal due to fades.

Moving down the columns of Nested Objects, the above-described process is performed on remaining Nested Objects 1-NO−1 in sequence to generate respective sequences of Payloads P(0,1)-P(n−1,1), P(0,2)-P(n−1,2) . . . P(0, NO−1)-P(n−1,NO−1) from the Nested Objects. Overall, a sequence of NO−1 sequences (starting from 0) of Payloads (i.e., a sequence of multiple Payload sequences) P(0,0)-P(n−1,0) . . . P(0,NO−1)-P(n−1,NO−1) are generated from Nested Objects 0 to NO−1.

Figure 4A:
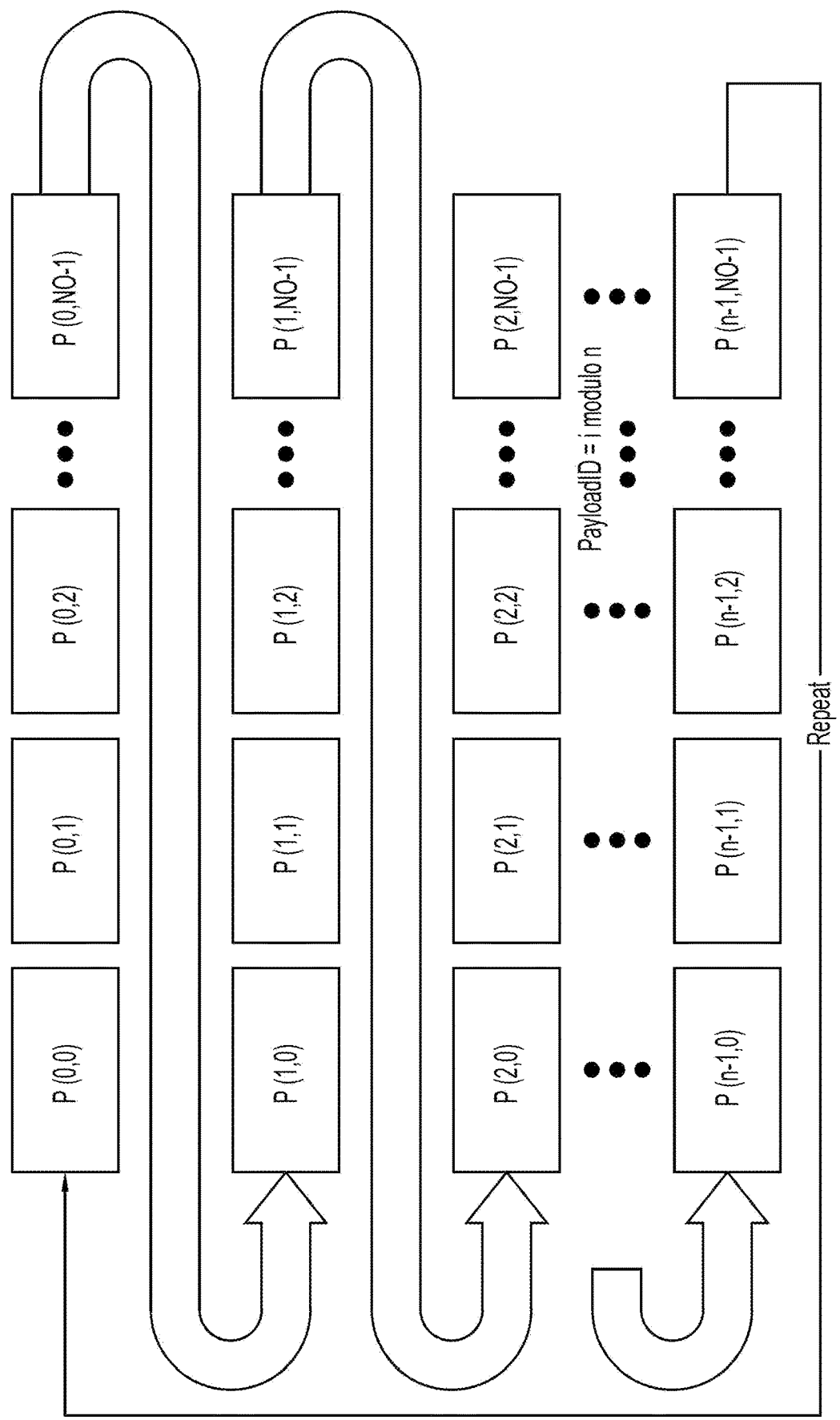
FIG. 4A shows example interleaving of sequences of Payloads generated by the operations of FIGS. 2 and 3 across Nested Objects.

As mentioned above, the codewords may be interleaved across the Payloads of a Nested Object. In addition, the Payloads may be interleaved across the Nested Objects, as shown in FIG. 4A, for example. Such interleaving of Payloads advantageously combats loss of transmitted signal/Payloads due to fades.

FIG. 4A shows example interleaving of the sequences of Payloads generated by the process of FIG. 3 across the Nested Objects, to produce interleaved sequences of Payloads in an interleaved order. In the example of FIG. 4A, the interleaved sequences of Payloads each includes one Payload from all of the sequences of Payloads. The interleaved sequences of Payloads are transmitted in the interleaved order. In the example, the interleaving orders the Payloads first by codeword symbol position PayloadID, and then by Nested Object number/identifier NestID, according to the following process/rules: produce a first interleaved sequence of all Payloads each carrying codeword symbol 0 and ordered by Nested Object numbers 0 to NO−1 (e.g., ordered Payloads P(0,0), P(0,1), . . . P(0,NO−1)); produce a second interleaved sequence of all Payloads each carrying codeword symbol 1 and ordered by Nested Object numbers 0 to NO−1 (e.g., ordered Payloads P(1,0), P(1,1), . . . P(1,NO−1)); and so on to produce a final/nth interleaved sequence of all Payloads carrying codeword symbol n−1 and ordered by Nested Objects 0 to NO−1 (e.g., ordered Payloads P(n−1,0), P(n−1,1), . . . P(n−1,NO−1)). The interleaved sequences of Payloads are transmitted in their interleaved order.

Object Interleaving

Figure 4B:
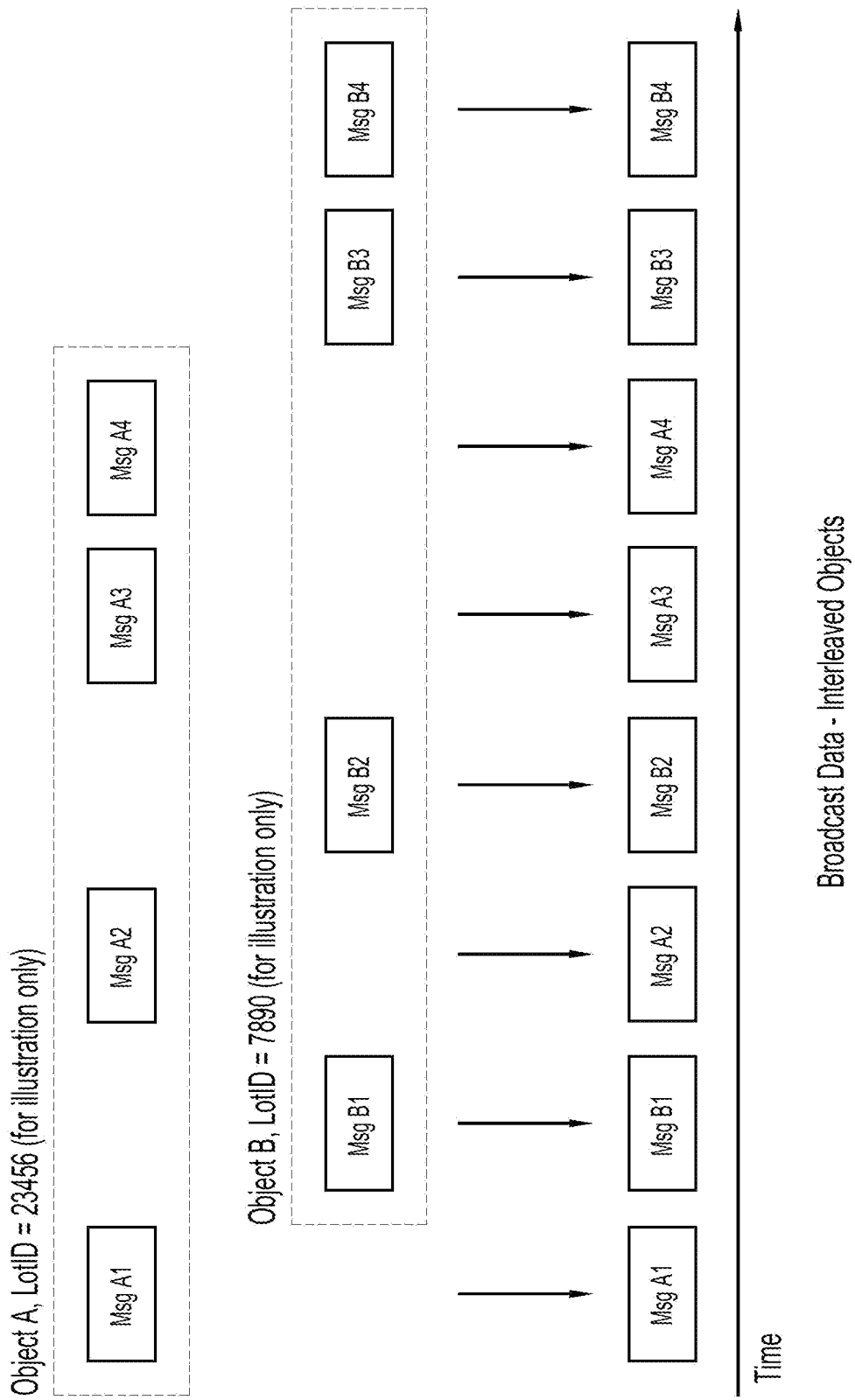
FIG. 4B is an illustration of example interleaved messages for different Objects.

Transmitter 102 may interleave messages for different large Objects as shown by way of example in FIG. 4B. In the example of FIG. 4B, Object A and Object B are each assigned a unique LotID. As shown, sequential messages A1-A4 for an Object A and sequential messages B1-B4 for an Object B are interleaved with each other (across the Objects) into an interleaved message order A1, B1, A2, B2, A3, A4, B3, and B4, and are transmitted in that order.

Decoding ELOT Messages

After receiving an ELOT message, the ELOT decoder of receiver 104 identifies and sorts the Payloads and associated Header information for each Nested Object NestID. When the size of an Object does not exceed 65536 bytes, for example, then the Nested Object comprises the entire Object. When the size of an Object is greater than 65536 bytes, for example, then multiple Nested Objects are processed. Only Payloads verified to be free of errors are stored along with their Position field until at least K+1 Payloads are stored. The receiver should ensure that no duplicate Payloads, although unlikely, are processed in the ELOT decoder.

The K+1 received Payloads are then deinterleaved to form 128 RS codewords of length K+1 for each Nested Object. These codewords are then decoded to reconstruct the message Fragments formed by the transmitter. Although only K uncorrupted codeword symbols from the Payloads are needed to decode the Nested Object, the additional Payload (and thus additional symbols) is used for error detection. If an error is detected in any of the K+1 Payloads, then two additional Payloads can be collected to enable correction of that error, with additional detection of any pattern of two errors. A method of recovering an Object from received Payloads is described below in connection with FIG. 8.

ELOT Message Structure

The transmitter assigns an integer called a LotID to each Object broadcast via the ELOT protocol. All messages for the same Object must use the same LotID. The choice of LotID is arbitrary except that no two objects being broadcast concurrently on the same HD RLS port may have the same LotID. It is recommended that all possible LotID values be exhausted before a value is reused. Repetition of Objects is not explicitly used for ELOT. Instead the Fragments are coded into Payloads, and transmission of K ELOT messages with their Payloads is equivalent to one repetition.

In an example, the size of the ELOT Object may be limited to 16,777,216 bytes (224). In this case, at transmitter 102, any larger file may be broken into multiple Objects with different LotIDs. Then, receiver 104 is responsible for assembling the multiple Objects of the file.

The new design replaces the 256-byte payload Fragment with a 256-byte coded Payload. The input Object is partitioned into up to 256 (NO≤256) Nested Objects, with up to 256 (K≤256) Payloads per Nested Object.

Figure 5:
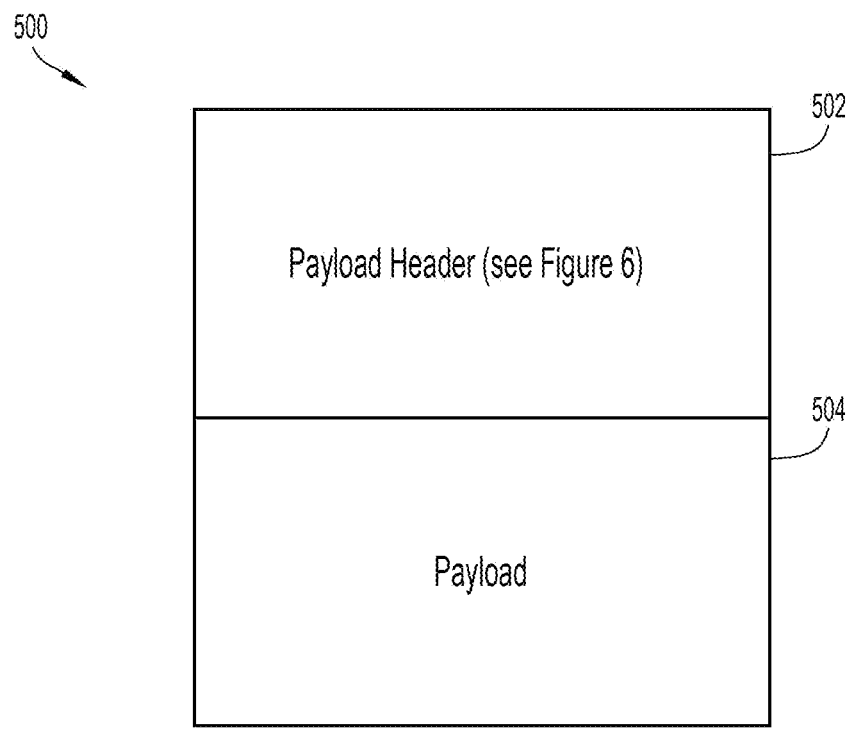
FIG. 5 is an illustration of an example message or packet including a Payload header and a Payload.

The ELOT protocol broadcasts an Object from the transmitter 102 to the receiver 104 using a message or packet 500 shown in FIG. 5. As shown in FIG. 5, message 500 includes a header 502 followed by a Payload 504 of the Nested Object from which the Payload was derived/generated. Header 502 message (FIG. 6) contains the information required to reassemble the Object from the Fragments plus descriptive information about the object. Generally, each message 500 contains one Payload 504 of the Nested Object identified in the header 502.

Figure 6:
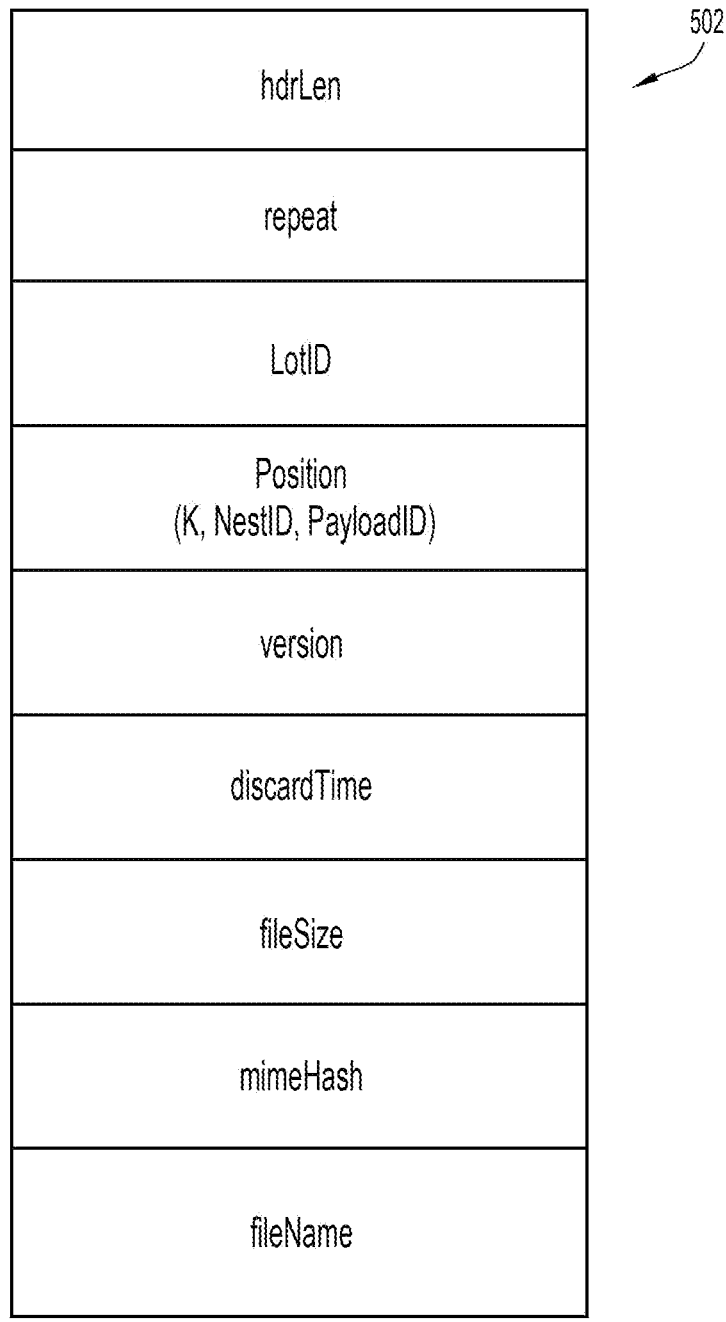
FIG. 6 is an illustration of an example format for the header of the packet.

FIG. 6 is an illustration of an example format for header 502 for packet 500. Header 502 may include some or all of the following fields: hdrLen—indicates a size of the header (e.g., in bytes); repeat—number of Nested Object repetitions remaining; LotID—arbitrary identifier of the Object from which the Payload was derived as assigned by the transmitter, such that all messages for the same Object use the same LotID value; position—includes (i) number K of information symbols (before RS coding) per Fragment used to generate the Nested Object from which the Payload was derived (i.e., the Nested Object to which the Payload pertains), (ii) NestID (e.g., 0-255), which is an identifier of the Nested Object starting sequentially from zero, and (iii) PayloadID (e.g., 0-65535), which is the symbol position in the RS code; version; discardTime; fileSize—size of the Object in bytes, for example; mimeHash—pass through information associated with a file conveyed by the Object; and filename—a name of the file. In an embodiment, header 502 may include only the hdrLen, repeat, LotID, and position fields.

Flowcharts for ELOT Transmit and Receive Methods

Figure 7:
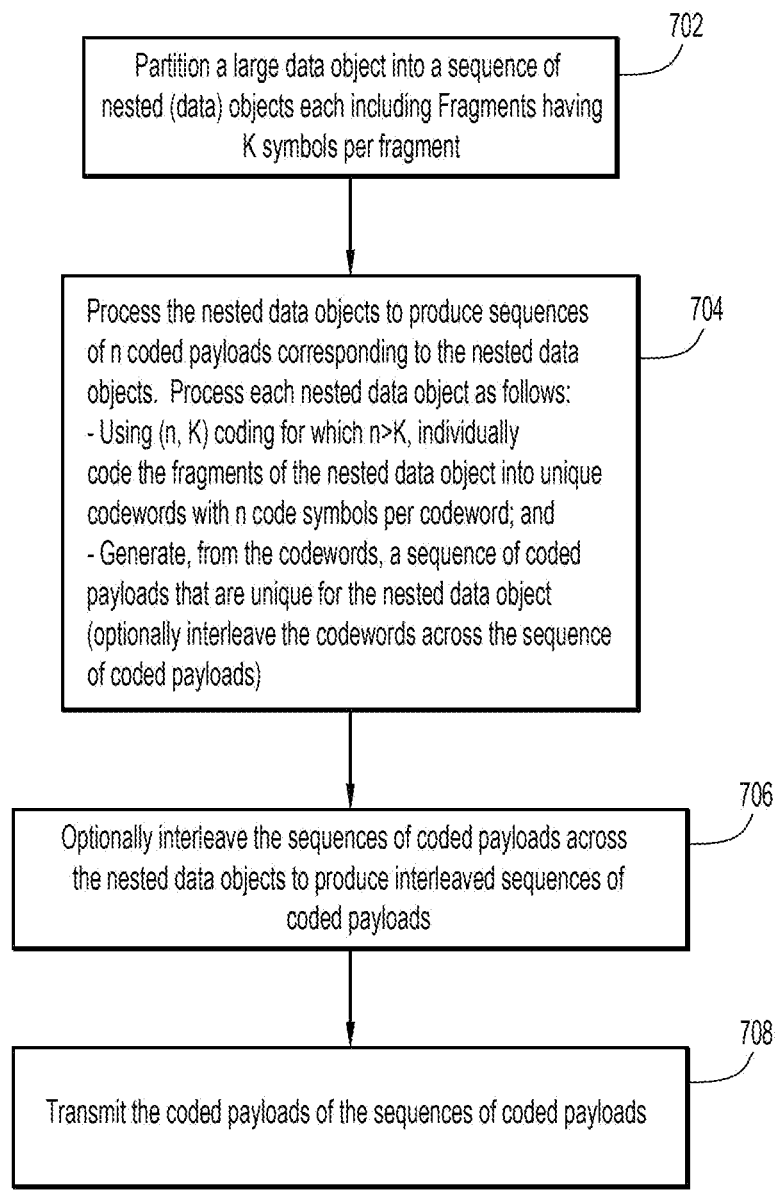
FIG. 7 is a flowchart of an example method of generating Payloads from an Object and then transmitting the Payloads, performed by the transmitter.

FIG. 7 is a flowchart of an example method 700 of generating Payloads from an Object and then transmitting the Payloads. Method 700 is performed by transmitter 102, and includes operations described above.

At 702, a large Object (or large "data Object") is partitioned into a sequence of Nested Objects (or "Nested Data Objects") each including Fragments having K symbols per fragment.

At 704, the Nested Objects are processed in sequence to produce sequences of Payloads (e.g., with n Payloads per sequence) corresponding to the Nested Objects. The Nested Objects have respective sizes that may be identical, and that are each smaller than the size of the large Object. Each Nested Object is processed as follows:

a. Using (n, K) coding for which n>K, the Fragments of the Nested Object are individually coded (i.e., encoded) into unique codewords with n codeword symbols per codeword.

b. A sequence of Payloads (among the sequences of Payloads) that are unique are generated for the Nested Object from the codewords. The Nested Object is completely recoverable from any K codeword symbols (of the Payloads for the Nested Object) that are unique (and error free). The codewords are optionally interleaved across the Payloads for the Nested Object. For, example, the n codeword symbols per codeword are interleaved across the sequence of Payloads for the Nested Object, such that each of the Payloads includes one codeword symbol from all of the codewords. Other interleaving patterns are possible. Alternatively, interleaving may be omitted.

In an embodiment, operation 704 computes, for each Payload, a Cyclic Redundancy Check (CRC) value based on the codeword symbols in the Payload, and inserts the CRC value into the Payload. The CRC may be used at the receiver to detect whether the Payload was received with any codeword symbol errors, i.e., to detect codeword symbol errors in the Payload.

At 706, optionally, the sequences of Payloads for the Nested Objects are interleaved across the Nested Objects to produce interleaved sequences of Payloads, such that the interleaved sequences each includes one Payload from all of the sequences of Payloads (that were not originally interleaved). Operation 706 may be omitted.

At 708, the Payloads of the sequences of Payloads are transmitted in order, e.g., in their interleaved order. For example, the Payloads are transmitted in an HD radio broadcast signal.

Figure 8:
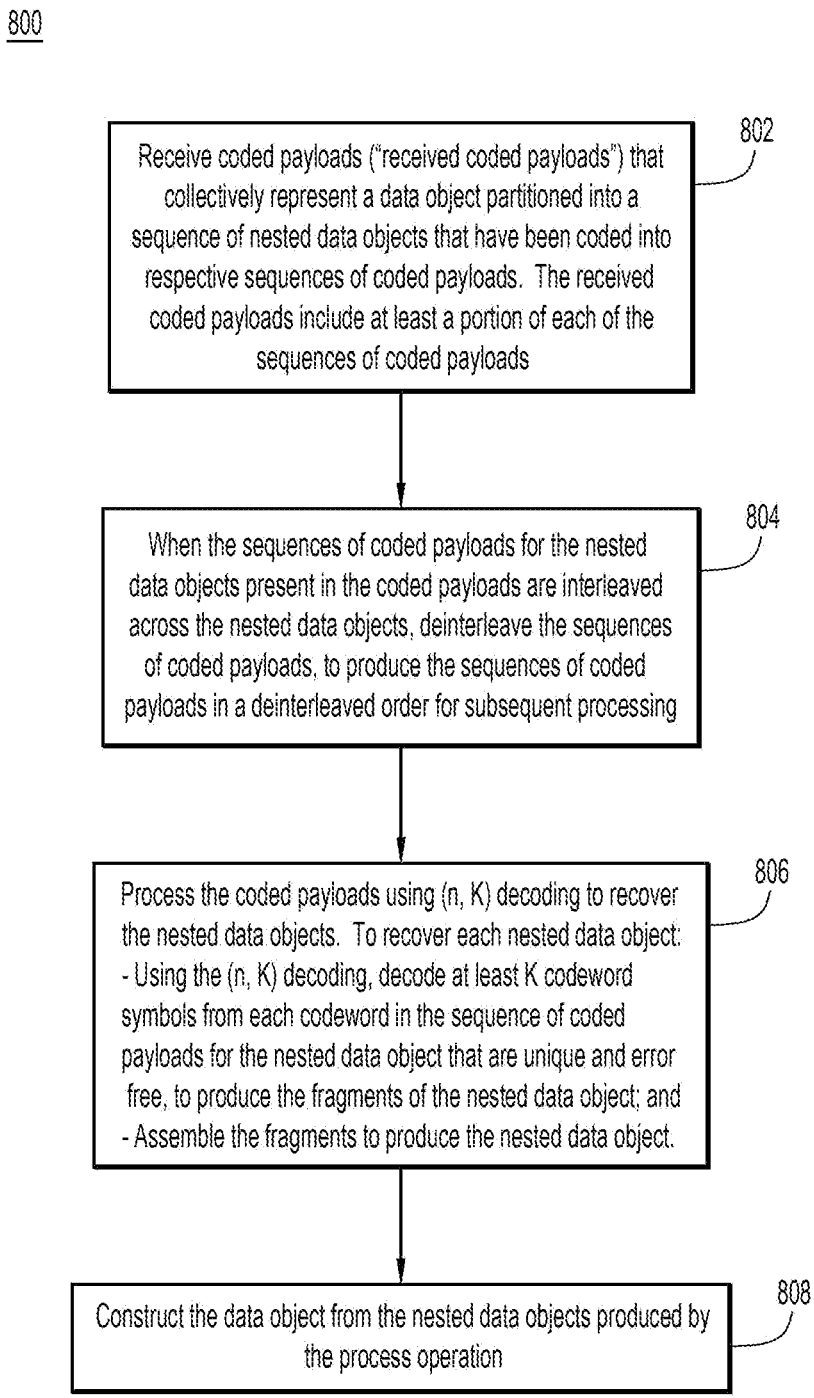
FIG. 8 is a flowchart of an example method of processing Payloads received by the receiver to recover an Object conveyed by the Payloads.

FIG. 8 is a flowchart of an example method 800 of processing Payloads received by receiver 104 to recover an Object conveyed by the Payloads. Method 800 is performed by receiver 104 (e.g., the ELOT decoder), and includes operations described above. Method 800 assumes receiver 104 possesses an a priori knowledge of operations used to generate the Payloads from the Object that is sufficient to enable the receiver to recover the Object from the Payloads using reverse/decoder operations, as described below.

At 802, method 800 receives Payloads transmitted by transmitter 102. The Payloads received by receiver 104 collectively represent a large Object partitioned into a sequence of Nested Objects each including Fragments having K symbols per fragment, the fragments of each Nested Object individually coded, using (n, K) coding with n>K, into unique codewords with n codeword symbols per codeword, the codewords for each Nested Object conveyed in a sequence of coded Payloads for the nested object that are unique. The coding is such that each Nested Object is completely recoverable from any K codeword symbols from each codeword in the Payloads for the Nested Object that are unique and error free. The Payloads received by receiver 104 include at least a portion of each sequence of Payloads for each Nested Object. For example, receiver 104 may receive only some of the Payloads in each of the sequences or, alternatively, all of the Payloads in each of the sequences.

At 804, when the sequences of Payloads for the Nested Objects present in the Payloads received at 802 are interleaved across the Nested Objects, method 800 deinterleaves the sequences of Payloads, to produce the sequences in a deinterleaved order for subsequent processing at 806. Operation 804 uses the position information in the Payload headers appended to the Payloads to deinterleave the Payloads into a correct, deinterleaved order.

At 806, method 800 processes the Payloads from 804 using (n, K) decoding (e.g., decoding and error correction as needed) to recover the Nested Objects. To recover each Nested Object:

a. Using the (n, K) decoding, decode at least K codeword symbols from each codeword in the sequence of Payloads for the Nested Object that are unique and error free, to produce the Fragments of the Nested Object. When the codewords for the Nested Object are interleaved with each other across the Payloads for the Nested Object, operation 806 first deinterleaves the codewords into a deinterleaved order based on information in the Payload headers appended to the Payloads and on a priori knowledge of how the codewords were interleaved at the transmitter, and then decodes the codewords as deinterleaved. On the other hand, when the codewords are not interleaved, the aforementioned deinterleaving is unnecessary.

b. Assemble the Fragments to produce the Nested Object.

Recovery operation 806 may decode the at least K codeword symbols in each codeword, without performing any error detection or correction. For example, the (n, K) decoding may not detect whether the codeword symbols are error free (or have errors).

Recovery operation 806 may decode more than K codeword symbols in each codeword that are unique, but that include one or more errors, i.e., are not error free. In this case, the (n, K) decoding may perform error correction to correct the one or more errors using the more than K codeword symbols in each codeword, to produce the at least K codeword symbols that are unique and error free. For example, K+1 codeword symbols allow the error correction to detect a single error, K+2 codeword symbols allow the error correction to correct 1 error, K+3 codeword symbols allow the error correction to correct 1 error and detect any pattern of 2 errors, and so on. In an example in which the Payloads each include a CRC value, operation 806 may detect codeword symbol errors in each Payload using the CRC value (i.e., compute a CRC value for the Payload as received and compare that CRC value to the value included in the Payload, such that a mismatch indicates an error).

In an embodiment, the (n, K) decoding uses an efficient decoding algorithm having a reduced computational complexity that grows with K and is independent of n, as shown below under the Section entitled "Reed Solomon Code."

At 808, method 800 constructs the large Object from the Nested Objects produced at 806.

Reed Solomon Code

Algorithm Description

This encoder uses the original definition of an RS codeword as a sequence of polynomial evaluations over GF(q). This approach is appropriate in applications where k<<n, as its computational complexity is O(kn) rather than O((n−k)n) for a conventional encoder. Notice that this implementation is non-systematic, in the sense that there is no explicit copy of the input message in the output codeword.

Encoding Algorithm

Given a message word $$u=[u_0,u_1,\ldots,u_{k-1}],$$

where $u_i$ is a symbol in GF(q), the corresponding codeword is $$c=[c_0,c_1,\ldots,c_{n-1}]$$

where $$c_i=u(\alpha_i)$$

with $$u(x)=\Sigma_{i=0}^{k-1}u_i x^i$$

(i.e., entries of u are interpreted as the coefficients of a polynomial of degree k−1 over GF(q)), and $$\alpha_0,\alpha_1,\ldots,\alpha_{n-1}$$

are distinct elements of GF(q).

The code length n must satisfy n≤q. When n=q, the $\alpha_i$ are all the elements of the field. We order the field elements lexicographically by their binary representation, i.e., with some abuse of notation, set $\alpha_j=j$ (meaning the j-th element in the order has a binary representation identical to that of the number j). The primitive polynomial used for this RS code is $$f(x)=x^0+x^2+x^3+x^5+x^{16}$$

Erasures-Only Decoding

We describe an erasure decoder for a Reed-Solomon (RS) code of length n and dimension k over GF(q), where k<<n≤q. The decoder is based on the original definition of an RS codeword as a sequence of polynomial evaluations over GF(q) (it assumes an encoder that actually encodes by polynomial evaluation). This approach is appropriate in applications where k<<n, as its computational complexity grows with k rather than the much larger n–k, which governs the computational complexity of a conventional RS decoder. The decoder reconstructs a vector of message symbols $$u=[u_0,u_1,\ldots,u_{k-1}], u_i \in GF(q),$$

which was encoded into $$c=[c_0,c_1,\ldots,c_{n-1}]$$

where $$c_i=u(\alpha_i)$$

with $$u(x)=\sum_{i=0}^{k-1} u_i x^i$$

and $$\alpha_0,\alpha_1,\ldots,\alpha_{n-1}$$

being a set of distinct elements of GF(q).

Assuming receipt of (at least) k original uncorrupted codeword symbols $$y=[c_{i_0},c_{i_1},\ldots,c_{i_{k-1}}],$$

and that u is reconstructed from y, as follows:
This leads to $$c_{i_j}=u(\alpha_{i_j})=\sum_{\ell=0}^{k-1} u_\ell \alpha_{i_j}^\ell,\ 0\leq j<k$$

These equations can be written in matrix form as $$y=u\cdot V,$$

where u and y are regarded as row vectors, and V is a k×k matrix given by $$V=\begin{bmatrix} 1 & 1 & \ldots & 1 \\ \alpha_{i_0} & \alpha_{i_1} & \ldots & \alpha_{i_{k-1}} \\ \alpha_{i_0}^2 & \alpha_{i_1}^2 & \ldots & \alpha_{i_{k-1}}^2 \\ \vdots & \vdots & \ldots & \vdots \\ \alpha_{i_0}^{k-1} & \alpha_{i_1}^{k-1} & \ldots & \alpha_{i_{k-1}}^{k-1} \end{bmatrix}.$$

A matrix of this form is known as a Vandermonde matrix. It is nonsingular if and only if the $\alpha_{i_j}$ are distinct, which is the case in our construction. Therefore, we can recover the message u as $$u=V^{-1}y.$$

The inverse $V^{-1}$ has a closed form expression. Let $$f_j(z)=\Pi_{0\leq t<k, t\neq j}(z-\alpha_{i_t}) \stackrel{\Delta}{=} \sum_{\ell=0}^{k-1} f_{j,\ell} z^\ell.$$

Then, it is well known that $$(V^{-1})_{j,\ell} = \frac{f_{j,\ell}}{f_j(\alpha_{i_j})},\ 0\leq i\leq k-1,\ 0\leq j\leq k-1.$$

We note that defining $$f(z) = \prod_{0\leq t<k}(z-\alpha_{i_t}),$$

then $$f_j(z) = \frac{f(z)}{z-\alpha_{i_j}}.$$

Thus, to compute the $f_j$, it suffices to compute f(z) once, and then divide f(z) by the appropriate linear term to obtain each of the $f_j$. Computing f(z) takes $O(k^2)$ arithmetic operations; then, computing each individual $f_j$ takes O(k) arithmetic operations. The scaling factor $$\frac{1}{f_j(\alpha_{i_j})}$$

is
also computed in O(k) arithmetic operations (one of them being an inversion). Overall, the computational complexity of constructing $V^{-1}$ explicitly is $O(k^2)$ arithmetic operations over GF(q) (whereas obtaining $V^{-1}$ from V would take $O(k^3)$ operations using straightforward Gaussian elimination). Given the all of the vectors and matrices involved are of length at most k in any dimension, and that the value n is not used, the decoding algorithm advantageously has a computational complexity that grows with k and is independent of n.

Notice also that it is not necessary to compute the whole matrix $V^{-1}$ and keep it in memory at any given time: as each $f_j$ provides all the information needed to compute the j-th row of $V^{-1}$, we can compute $u=y\cdot V^{-1}$ sequentially, producing one row of $V^{-1}$ at a time, multiplying by the appropriate $y_j$, and accumulating. Therefore, the algorithm storage requirements are O(k).

Summary of the Decoding Algorithm
    a. Input: Received symbols $y=[y_0, y_1, \ldots, y_{k-1}]$ and indices $[i_0, i_1, \ldots, k_{k-1}]$ such that $y_j=c_{i_j}$
    b. Output:
        Given $i_0, i_1, \ldots i_{k-1}$, obtain $\alpha_{i_0}, \alpha_{i_2}, \ldots, \alpha_{i_{k-1}}$ (in this implementation, $\alpha_{i_j}$ is taken to be the field element with the same binary representation as the integer $i_j$, so there's nothing to do here).
        Compute the polynomial f(z) as defined above.
        Set $u=[0, 0, \ldots, 0]$ (a k-vector)
        For each j=0, 1, . . . , k–1<ol type="a"><li> From f(z) and $\alpha_{i_j}$, compute $$f_j(z) = \frac{f(z)}{z-\alpha_{i_j}}\ \text{and}\ \beta_j = \frac{1}{f_j(\alpha_{i_j})}.$$

Set $u \leftarrow u+y_j\beta_j f_j$ and ($y_j$ and $\beta_j$ are scalars, $f_j$ is a k-vector)

Output u.

Error Detection and Correction

The erasures-only decoding algorithm assumes the k symbols received are uncorrupted. It will always reconstruct a message vector u from these k symbols. If any symbol is corrupted by noise, the reconstructed message will also be corrupted (one error in the received symbols will usually cause all symbols in the reconstructed message to be incorrect).

If more than k received symbols are available, then error detection and correction are possible. We describe handling error detection and correction in a system where k+r received symbols are available, for r=0, 1, 2, 3. The case r=0 reduces to the erasures-only decoding described in Sec. 2

The case of most interest is r=2. We present the mathematical background for this case first, and then describe the algorithms for r=1, 2, 3 in detail.

Assume receipt of $y=[y_0, y_1, \ldots, y_{k-1}, y_k, y_{k+1}]$ corresponding to column locators $[\alpha_{i_0}, \alpha_{i_1}, \ldots, \alpha_{i_{k-1}}, \alpha_{i_k}, \alpha_{i_{k+1}}]$, and assume $y_j$ is in error, where it is initially assumed $0 \leq j < k$ (the cases j=k, k+1 will be disposed of easily later on). Thus, we have $$y = w + \varepsilon e_j,$$

where w is the (k+2)-vector that would have been received in an error-free transmission, $\varepsilon$ is the error value, and $e_j$ is a unit vector with a 1 in location j.

The vector w is a codeword in a [k+2, k, 3] generalized RS code with a systematic generator matrix of the form G=[I A], where I is a k×k identity matrix, A is a k×2 matrix with entries of the form $$A_{j\ell} = \frac{f(\alpha_{i_{k+\ell}})}{(\alpha_{i_{k+\ell}} - \alpha_{i_j}) f_j(\alpha_{i_j})}, \quad 0 \leq j < k, \ell = 0, 1$$

(Roth-Seroussi '85), and where f(z) and $f_j(z)$ are the polynomials defined in Sec. 2.

Let $\bar{y}=[y_0, y_1, \ldots, y_{k-1}]$, and similarly $\bar{w}=[w_0, w_1, \ldots, w_{k-1}]$. Then, $$\bar{y}A = (\bar{w}+\varepsilon e_j)A = [w_k, w_{k+1}] + \varepsilon[A_{j,0}, A_{j,1}] = [y_k, y_{k+1}] + \varepsilon[A_{j,0}, A_{j,1}],$$

where the last equality follows from the fact that there were no errors in the last two coordinates of y. The syndrome of y is defined as $$s = [s_0, s_1] \stackrel{\Delta}{=} \bar{y}A - [y_k, y_{k+1}] = \varepsilon[A_{j,0}, A_{j,1}],$$

where the last equality follows from the equation for $\bar{y}A$ above.

Notice that the syndrome can be computed directly from the received word y. Using the expression for $A_{j\ell}$ above, we have $$\frac{s_0}{s_1} = \frac{(\alpha_{i_{k+1}} - \alpha_{i_j}) f(\alpha_{i_k})}{(\alpha_{i_k} - \alpha_{i_j}) f(\alpha_{i_{k+1}})},$$

from which $\alpha_{i_j}$ can be solved, which gives us the location j of the error. The error value is then recovered as $$\varepsilon = \frac{s_0}{A_{j,0}}.$$

Notice that it is not necessary to compute the entries of the matrix A explicitly. Instead, $\bar{y}$ is decoded using the erasures-only procedure, to obtain a tentative message $\bar{u}$. It can be readily verified that $$\bar{y}A = [\bar{u}(\alpha_{i_k}), \bar{u}(\alpha_{i_{k+1}})].$$

In the case considered so far, where the error is in one of the first k locations, both syndrome symbols are necessarily nonzero, since so are the entries of A. The case of an error occurring in locations k or k+1 is detected by one of the syndrome symbols being zero. This error can be ignored, since an erasures-only decoding based on y will return the correct decoded message u.

Next, the decoding algorithms for r=1, 2, 3 is described in detail.

Case r=1:

In this case, it is possible to detect one error, using the following algorithm:

a. Input: Received symbols $y=[y_0, y_1, \ldots, y_{k-1}, y_k]$ and indices $[i_0, i_1, \ldots i_{k-1}, i_k]$ such that $y_j = c_{i_j}$ b. Output: Pair (u, D), where u is the reconstructed message k-vector, and D is a boolean flag indicating whether an error was detected.

Do erasures-only decoding on $[y_0, y_1, \ldots, y_{k-1}]$ and $[i_0, i_1, \ldots i_{k-1}]$, obtaining a decoded message u.

Compute $s_0 = u(\alpha_{i_k}) - y_k$.

Set D=False if $s_0 = 0$, True otherwise.

RETURN (u, D).

Notice that when D=True, the output u is most likely incorrect (the only case in which u is still correct is when the received symbol affected by noise was $y_k$; there is no way for the decoder to determine whether that is the case).

Case r=2:

In this case, it is possible to correct every instance of a single symbol error, and also detect many (uncorrectable) error patterns of more than one error. The algorithm is described below.

a. Input: Received symbols $y=[y_0, y_1, \ldots, y_{k-1}, y_k, y_{k+1}]$ and indices $[i_0, i_1, \ldots i_{k-1}, i_k, i_{k+1}]$ such that $y_j = c_{i_j}$ b. Output: Triplet (u, C, D), where u is the reconstructed message k-vector, C is a boolean indicating whether an error was corrected, and D is a boolean flag indicating whether an (uncorrectable) error pattern was detected.

Do erasures-only decoding on $[y_0, y_1, \ldots, y_{k-1}]$ and $[i_0, i_1, \ldots i_{k-1}]$, obtaining a candidate decoded message u.

From this computation, save the auxiliary polynomial f(z) described in Sec. 2.

Compute the syndrome $[s_0, s_1] = [u(\alpha_{i_k}) - y_k, u(\alpha_{i_{k+1}}) - y_{k+1}]$.

If $[s_0, s_1] = [0,0]$, RETURN (u, False, False) (no errors detected or corrected).

If $s_0 = 0$ or $s_1 = 0$, RETURN (u, True, False) (there was an error in one of the redundant symbols $[y_k, y_{k+1}]$, but the decoded message is correct—the error is still reported).

Compute $$\lambda = \frac{f(\alpha_{i_{k+1}})s_0}{f(\alpha_{i_k})s_1}.$$

If $\lambda=1$, RETURN (u, False, True) (uncorrectable error pattern).
Set $$\beta = \frac{\alpha_{i_{k+1}} - \lambda\alpha_{i_k}}{1-\lambda}.$$

If $\beta \notin \{\alpha_{i_0}, \alpha_{i_1}, \ldots \alpha_{i_{k-1}}\}$, RETURN (u, False, True) (uncorrectable error pattern).
Let j be such that $\beta=\alpha_{i_j}$, $0 \leq j < k$. The symbol $y_j$ is in error.
Let $$f_j(z) = \frac{f(z)}{z-\beta}$$

(see Sec. 2), and let $f_j$ represent the corresponding k-vector.
Set $$u \leftarrow u - \frac{s_0(\alpha_{i_k} - \beta)}{f(\alpha_{i_k})}f_j$$

(apply correction directly to message u).
RETURN (u, True, False) (successful return with one error corrected).
Case r=3:
In this case, any pattern of one error can be corrected and any pattern of two errors can be detected. We decode as in the r=2 case, and then check for consistency of the result with the k+3rd symbol. If the check fails, the return code is changed to RSDEC_ERROR_DETECTED (uncorrectable error pattern), even if the r=2 decoding had returned a successful return code. There are two exceptions to this rule: if the r=2 decoding returned RSDEC_OK or RSDEC_ERROR_IN_REDUNDANT, then the failed check in the k+3rd symbol is due to an error in that symbol itself, and the decoded message is still correct. In this, case the return code from the r=3 decoder is RSDEC_ERROR_IN_REDUNDANT.

Transmit/Receive Device

Figure 9:
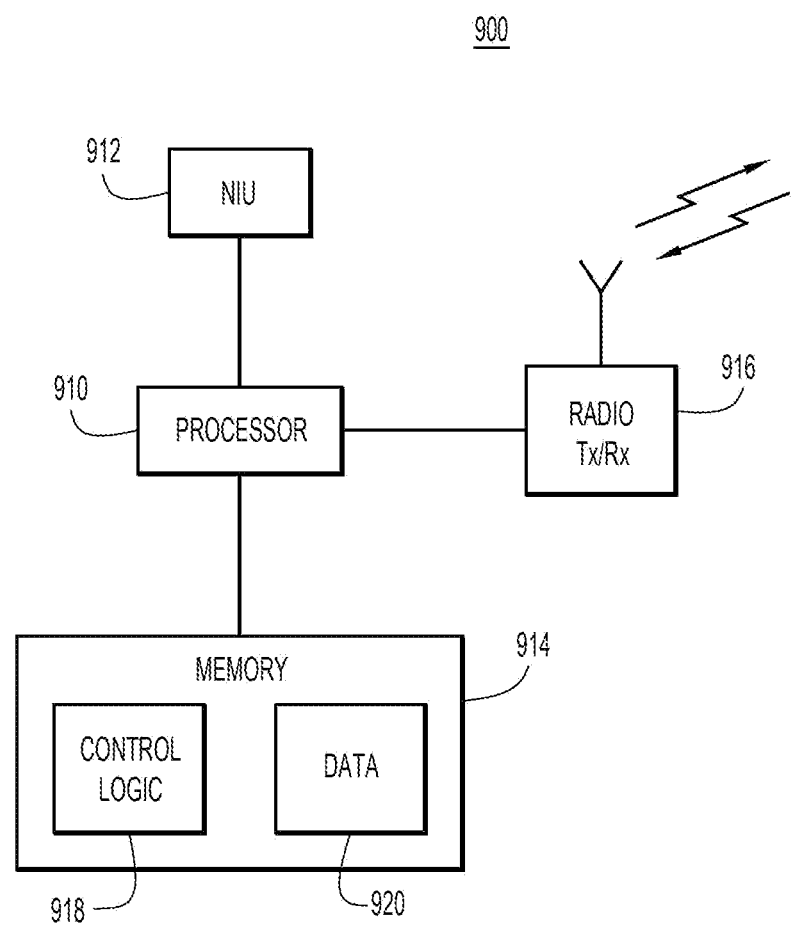
FIG. 9 is an example radio apparatus that represents the transmitter and/or the receiver.

FIG. 9 is a block diagram of an example radio apparatus or device 900 (also referred to simply as "radio 900") representative of transmitter 102 and/or receiver 104. Radio 900 is configured to perform the methods/operations described above. Radio 900 may be an HD radio transmit/broadcast station or an HD radio receiver for a vehicle, for example. Radio 900 includes a processor 910, a Network Interface Unit (NIU) 912, a memory 914, and a radio transmitter/receiver (transceiver) module 916 all coupled to, and thus able to communicate with, one another. Radio transceiver module 916 includes one or more antennas to transmit and receive wireless signals (e.g., radio frequency (RF) signals) that convey packets as described herein. In some embodiments, transceiver module 916 may be replaced with only a receiver module or only a transmitter module.

Transceiver module 916 may include receive and transmit baseband processors (BBPs), for example. In a receive direction, the one or more antennas receive a modulated RF signal that conveys a sequence of packets/Payloads generated and transmitted by a transmitter as described above. The receive BBP converts the (received) modulated RF signal to a baseband signal that conveys the sequence of packets/Payloads and delivers the baseband signal to processor 910, which receives and processes the sequence of packets/Payloads. In a transmit direction, the transmit BBP converts a baseband signal (that conveys a sequence of packets/Payloads) from processor 910 to a modulated RF signal (that conveys the sequence of packets/Payloads) and transmits the RF signal via the one or more antennas. In alternative embodiments, the receive and transmit BBPs may be implemented by processor 910 or shared between the processor and radio transceiver module 916.

Memory 914 stores control software 918 (referred as "control logic"), that when executed by the processor 910, causes the processor to control radio 900 to perform the various operations described herein. The processor 910 may be a microprocessor or microcontroller (or multiple instances of such components). The NIU 912 enables radio 900 to communicate over wired connections or wirelessly (e.g., to communicate the packets/Payloads described herein) with a network. NIU 912 may include, for example, an Ethernet card or other interface device having a connection port that enables the radio station 900 to communicate over the network via the connection port. In a wireless embodiment, NIU 912 includes a wireless transceiver and an antenna to transmit and receive wireless communication signals to and from the network.

The memory 914 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 914 may comprise one or more tangible (non-transitory) computer readable storage media (e.g., memory device(s)) encoded with software or firmware that comprises computer executable instructions. Control software 918 may include logic to implement methods/operations performed by receiver 104, including the ELOT decoder, such as receiving and processing Payloads, as described above. Control software 918 may include logic to implement methods/operations performed by transmitter 102, such as generating Payloads from Objects/Nested Objects and transmitting the Payloads, as described above. Memory 914 also stores data 920 generated and used by control software 918.

In summary, ELOT techniques presented herein provide an improved mechanism for efficiently communicating large Objects (e.g., large data files). The ELOT techniques improve on an existing LOT technique that suffers from extreme inefficiency due to reception of duplicate Fragments of the original object, where every Fragment must be successfully received, which leads to very long object recovery times at the receiver. The ELOT techniques use efficient, low-rate RS encoding/decoding of object Fragments, along with the use of Nested Objects, to provide an efficient and scalable solution for communication of large Objects. The ELOT techniques advantageously minimize reception time and avoid transmission of duplicate packets in that it is not necessary to receive all Fragments from many repeat transmissions, as in prior solutions. ELOT can send up to $2^{16}$ Payloads before repeating information, for example. Also ELOT is efficiently scalable to very large Objects. ELOT can detect and correct a single error in the received packets, and the efficient RS (ELOT) decoder allows for practical implementations. ELOT may replace existing LOT for an HD Radio system, for example.

In an embodiment of ELOT:
a. Objects are divided into one or more Nested Objects.
b. Each Nested Object is partitioned into, e.g., 128 Fragments of up to 512 bytes each.
c. Each Fragment is encoded using an extremely low rate (but large) Reed-Solomon (RS) block code.
d. $RS(2^{16}, K)$ with 16-bit symbols and $K \leq 256$: code rate $R \leq 1/256$.
e. The ELOT allows correction of 1 or more errors on reception.
f. Codeword symbols in each Nested Object may be interleaved to create Payloads containing one RS symbol from each of the 128 parallel RS codewords.
g. Nested Objects may also be interleaved to prevent large gaps in their decoding.

In an embodiment, a method is provided comprising: partitioning a data object into a sequence of nested data objects each including fragments having K symbols per fragment; processing the nested data objects to produce sequences of coded payloads corresponding to the nested data objects, the processing including, for each nested data object: using (n, K) coding for which n>K, individually coding the fragments of the nested data object into codewords with n codeword symbols per codeword; and generating, from the codewords, a sequence of coded payloads that are unique for the nested data object; and transmitting coded payloads of the sequences of coded payloads. Each of the nested data objects is completely recoverable from any K codeword symbols, in each codeword from the sequence of coded payloads for the nested data object, that are unique and error free.

In another embodiment, an apparatus is provided comprising: a radio transmitter; and a processor coupled to the radio transmitter and configured to: partition a data object into a sequence of nested data objects each including fragments having K symbols per fragment; process the nested data objects to produce sequences of coded payloads corresponding to the nested data objects, wherein the processor is configured to process each nested data object by: using (n, K) coding for which n>K, individually code the fragments of the nested data object into codewords with n codeword symbols per codeword; and generate, from the codewords, a sequence of coded payloads that are unique for the nested data object; and cause the radio transmitter to transmit the coded payloads of the sequences of coded payloads (e.g., provide the coded payloads to the radio transmitter for transmission).

In yet another embodiment, a computer readable medium is provided. The computer readable medium is encoded with instructions that, when executed by a processor of a transmitter, cause the processor to perform: partitioning a data object into a sequence of nested data objects each including fragments having K symbols per fragment; processing the nested data objects to produce sequences of coded payloads corresponding to the nested data objects, the processing including, for each nested data object: using (n, K) coding for which n>K, individually coding the fragments of the nested data object into codewords with n codeword symbols per codeword; and generating, from the codewords, a sequence of coded payloads that are unique for the nested data object; and causing the coded payloads of the sequences of coded payloads to be transmitted by the transmitter.

In another embodiment, a method is provided comprising: receiving coded payloads that collectively represent a data object partitioned into a sequence of nested data objects each including fragments having K symbols per fragment, the fragments of each nested data object individually coded, using (n, K) coding with n>K, into codewords with n codeword symbols per codeword, the codewords for each nested data object conveyed in a sequence of coded payloads that are unique for the nested data object, at least a portion of each sequence of coded payloads for each nested data object included in the coded payloads from the receiving; processing the coded payloads using (n, K) decoding to recover the nested data objects (e.g., using the (n, K) decoding, recovering the nested data objects from the coded payloads); and constructing the data object from the nested data objects produced by the processing/recovering. The processing includes recovering each nested data object by: using the (n, K) decoding, decoding at least K codeword symbols in each codeword from the sequence of coded payloads for the nested data object that are unique and error free, to produce the fragments of the nested data object; and assembling the fragments to produce the nested data object.

In yet another embodiment, an apparatus is provided comprising: a radio receiver; and a processor coupled to the radio receiver and configured to: receive from the radio receiver coded payloads that collectively represent a data object partitioned into a sequence of nested data objects each including fragments having K symbols per fragment, the fragments of each nested data object individually coded, using (n, K) coding with n>K, into codewords with n codeword symbols per codeword, the codewords for each nested data object conveyed in a sequence of coded payloads that are unique for the nested data object, at least a portion of each sequence of coded payloads for each nested data object included in the coded payloads from the radio receiver; process the coded payloads using (n, K) decoding to recover the nested data objects; and construct the data object from the nested data objects from the processing.

In yet another embodiment, a computer readable medium is provided. The computer readable medium is encoded with instructions that, when executed by a processor of a receiver, cause the processor to perform: receiving coded payloads that collectively represent a data object partitioned into a sequence of nested data objects each including fragments having K symbols per fragment, the fragments of each nested data object individually coded, using (n, K) coding with n>K, into codewords with n codeword symbols per codeword, the codewords for each nested data object conveyed in a sequence of coded payloads that are unique for the nested data object, at least a portion of each sequence of coded payloads for each nested data object included in the coded payloads from the receiving; processing the coded payloads using (n, K) decoding to recover the nested data objects; and constructing the data object from the nested data objects from the processing.

Although the techniques are illustrated and described herein as embodied in one or more specific examples, it is nevertheless not intended to be limited to the details shown, since various modifications and structural changes may be made within the scope and range of equivalents of the claims.

Each claim presented below represents a separate embodiment, and embodiments that combine different claims and/or different embodiments are within the scope of the disclosure and will be apparent to those of ordinary skill in the art after reviewing this disclosure.

What is claimed is:

1. A method comprising:
   partitioning a data object into a plurality of nested data objects, wherein each nested data object of the plurality of nested data objects is partitioned into a predefined number of fragments, each fragment having K symbols;
   processing each nested data object to produce sequences of coded payloads corresponding to each nested data object, the processing including, for each nested data object:
   using (n, K) coding for which n>K, individually coding the fragments of the nested data object into codewords with n codeword symbols per codeword; and
   generating, from the codewords, a sequence of coded payloads that are unique for the nested data object, wherein the sequence of the coded payloads is ordered by a codeword symbol position and then by a nested data object identifier according to a rule; and
   transmitting coded payloads of the sequences of coded payloads.

2. The method of claim 1, wherein the generating includes interleaving the codewords across the sequence of coded payloads.

3. The method of claim 2, wherein the interleaving includes interleaving the n codeword symbols per codeword across the sequence of coded payloads for each nested data object, such that the coded payloads of the sequence for each nested data object each includes one codeword symbol from all of the codewords.

4. The method of claim 2, further comprising:
   interleaving the sequences of coded payloads across the plurality of nested data objects to produce interleaved sequences of coded payloads, such that the interleaved sequences of coded payloads each includes coded payloads from all of the sequences of coded payloads,
   wherein the transmitting includes transmitting the interleaved sequences of coded payloads.

5. The method of claim 1, further comprising:
   interleaving the sequences of coded payloads across each nested data objects to produce interleaved sequences of coded payloads, such that the interleaved sequences each includes coded payloads from all of the sequences of coded payloads,
   wherein the transmitting includes transmitting the interleaved sequences of coded payloads.

6. The method of claim 1, wherein the transmitting includes transmitting the coded payloads in packets that include first identifiers of the coded payloads, second identifiers of the plurality of nested data objects from which the coded payloads were produced by the processing, and a number K of symbols per fragment.

7. The method of claim 1, wherein the (n, K) coding includes (n, K) Reed-Solomon coding.

8. The method of claim 1, wherein each nested data object is completely recoverable from any K codeword symbols in each codeword from the sequence of coded payloads for each nested data object that are unique and error free.

9. The method of claim 1, wherein the data object carries information to be transmitted via an HD Radio broadcast signal.

10. The method of claim 1, wherein the plurality of nested data objects have respective sizes that are each smaller than a size of the data object.

11. A method comprising:
    receiving coded payloads that collectively represent a data object partitioned into a plurality of nested data objects, wherein each nested data object of the plurality of nested data objects is partitioned into a predefined number of fragments, each fragment having K symbols, the fragments of each nested data object individually coded, using (n, K) coding with n>K, into codewords with n codeword symbols per codeword, the codewords for each nested data object conveyed in a sequence of coded payloads that are unique for each nested data object, at least a portion of each sequence of coded payloads for each nested data object being included in the coded payloads from the receiving and the sequence of coded payloads being ordered by a codeword symbol position and then by a nested data object identifier according to a rule;
    processing the coded payloads using (n, K) decoding to recover the plurality of nested data objects; and
    constructing the data object from the plurality of nested data objects from the processing.

12. The method of claim 11, wherein the processing includes recovering each nested data object by:
    using the (n, K) decoding, decoding at least K codeword symbols in each codeword from the sequence of coded payloads for each nested data object that are unique and error free, to produce the fragments of each nested data object; and
    assembling the fragments to produce each nested data object.

13. The method of claim 12, wherein the decoding includes performing the decoding without performing any error correction.

14. The method of claim 12, wherein:
    the decoding includes decoding more than K codeword symbols in each codeword from the sequence of coded payloads for each nested data object that are unique and include one or more errors, and performing error correction to correct the one or more errors using the more than K codeword symbols, to produce the at least K codeword symbols that are unique and error free.

15. The method of claim 12, wherein the (n, K) decoding includes (n, K) Reed-Solomon (RS) decoding.

16. The method of claim 15, wherein a computational complexity of the (n, K) RS decoding grows with K and is independent of n.

17. The method of claim 12, wherein the codewords for each nested data object are interleaved with each other, and the recovering each nested data object further includes:
    deinterleaving the codewords that are interleaved to produce codewords that are deinterleaved; and
    performing the decoding on the codewords that are deinterleaved.

18. The method of claim 17, wherein the codewords are interleaved such that the n codeword symbols per codeword are interleaved across the sequence of coded payloads, and the coded payloads of the sequence each include one codeword symbol from all of the codewords.

19. The method of claim 11, wherein the sequences of coded payloads for the plurality of nested data objects present in the coded payloads are interleaved across the plurality of nested data objects, such that each of the sequences that are interleaved includes coded payloads from all of the sequences of coded payloads, and the method further comprises:
    deinterleaving the sequences of coded payloads that are interleaved to produce the sequences of coded payloads in a deinterleaved order,
    wherein the processing includes processing the sequences of coded payloads in the deinterleaved order.

20. The method of claim 11, wherein:
the receiving includes receiving the coded payloads in packets that include first identifiers of the coded payloads and second identifiers to identify which of the coded payloads are associated with which of the plurality of nested data objects; and
the processing includes recovering the nested data objects from the coded payloads associated with the plurality of nested data objects based on the first identifiers and the second identifiers.

21. The method of claim 20, wherein the constructing includes:
concatenating the plurality of nested data objects from the processing in an order corresponding to an order of the plurality of nested data objects in the sequence of the plurality of nested data objects based on the first identifiers and the second identifiers.

22. The method of claim 11, wherein the data object carries information received via an HD Radio broadcast signal.

23. An apparatus comprising:
a radio receiver; and
a processor coupled to the radio receiver and configured to perform:
receiving, from the radio receiver, coded payloads that collectively represent a data object partitioned into a plurality of nested data objects, wherein each nested data object of the plurality of nested data objects is portioned into a predefined number of fragments, each fragment having K symbols, the fragments of each nested data object individually coded, using (n, K) coding with n>K, into codewords with n codeword symbols per codeword, the codewords for each nested data object conveyed in a sequence of coded payloads that are unique for each nested data object, at least a portion of each sequence of coded payloads for each nested data object included in the coded payloads from the radio receiver and the sequence of coded payloads being ordered by a codeword symbol position and then by a nested data object identifier according to a rule;
processing the coded payloads using (n, K) decoding to recover the plurality of nested data objects; and
constructing the data object from the plurality of nested data objects from the processing.

24. The apparatus of claim 23, wherein the processor is configured to perform the processing by recovering each nested data object by:
using the (n, K) decoding, decoding at least K codeword symbols in each codeword from the sequence of coded payloads for each nested data object that are unique and error free, to produce the fragments of each nested data object; and
assembling the fragments to produce each nested data object.

25. The apparatus of claim 24, wherein the processor is configured to perform the decoding without performing error correction.

26. The apparatus of claim 24, wherein the processor is configured to perform the decoding by decoding more than K codeword symbols in each codeword in the sequence of coded payloads for each nested data object that are unique and include one or more error, and performing error correction to correct the one or more errors using the more than K codeword symbols, to produce the at least K coded symbols that are unique and error free.

27. The apparatus of claim 24, wherein the (n, K) decoding includes (n, K) Reed-Solomon decoding.

28. The apparatus of claim 27, wherein a computational complexity of the (n, K) Reed-Solomon decoding grows with K and is independent of n.

29. The apparatus of claim 24, wherein the codewords for each nested data object are interleaved with each other, and the processor is configured to perform the recovering by:
deinterleaving the codewords that are interleaved to produce codewords that are deinterleaved; and
performing the decoding on the codewords that are deinterleaved.

30. The apparatus of claim 23, wherein the sequences of coded payloads for the plurality of nested data objects present in the coded payloads are interleaved across the plurality of nested data objects, and the processor is further configured to perform:
deinterleaving the sequences of coded payloads that are interleaved to produce the sequences of coded payloads in a deinterleaved order; and
performing the processing on the sequences of coded payloads in the deinterleaved order to recover the plurality of nested data objects.

* * * * *